United States Patent
Demendi et al.

(10) Patent No.: US 6,716,800 B2
(45) Date of Patent: Apr. 6, 2004

(54) COMPOSITE BODY OF SILICON CARBIDE AND BINDERLESS CARBON, PROCESS FOR PRODUCING SUCH COMPOSITE BODY, AND ARTICLE OF MANUFACTURING UTILIZING SUCH COMPOSITE BODY FOR TRIBOLOGICAL APPLICATIONS

(75) Inventors: Joseph F. Demendi, Crystal Lake, IL (US); Xin Chen, Crystal Lake, IL (US); William R. Clemens, Carpentersville, IL (US)

(73) Assignee: John Crane Inc., Morton Grove, IL (US)

( * ) Notice: Subject to any disclaimer, the term of this patent is extended or adjusted under 35 U.S.C. 154(b) by 0 days.

(21) Appl. No.: 10/122,293

(22) Filed: Apr. 12, 2002

(65) Prior Publication Data

US 2003/0195122 A1 Oct. 16, 2003

(51) Int. Cl.⁷ .................. C10M 103/00; C04B 35/565
(52) U.S. Cl. ............... 508/107; 508/109; 501/88; 501/89; 501/90; 501/99; 428/408; 428/446; 428/698; 264/29.1; 264/682
(58) Field of Search ............ 508/107; 428/698; 501/88, 89, 90, 99

(56) References Cited

U.S. PATENT DOCUMENTS

| 4,525,461 A | 6/1985 | Boecker et al. ........... 501/90 |
| 4,536,449 A | 8/1985 | Kennedy et al. .......... 428/408 |
| 4,690,909 A | 9/1987 | Okuno et al. ............. 501/90 |
| 4,701,426 A | 10/1987 | Okuno et al. ............. 501/90 |
| 4,942,145 A | 7/1990 | Moehle et al. ............ 501/90 |
| 5,080,378 A | 1/1992 | Kagawa .................... 277/96 |
| 5,322,824 A | 6/1994 | Chia ....................... 501/89 |
| 5,422,322 A | 6/1995 | Chen et al. ............... 501/90 |
| 5,486,496 A | 1/1996 | Talbert et al. ............ 501/90 |
| 5,538,649 A | 7/1996 | Demendi et al. .......... 508/101 |
| 5,543,368 A | 8/1996 | Talbert et al. ............ 501/90 |
| 5,580,834 A * | 12/1996 | Pfaff ...................... 501/90 |
| 5,656,563 A | 8/1997 | Chen et al. ............... 501/90 |
| 5,707,567 A * | 1/1998 | Pfaff ...................... 264/29.7 |
| 5,939,185 A | 8/1999 | Greim et al. ............. 428/331 |
| 5,968,653 A * | 10/1999 | Coppella et al. ......... 428/408 |
| 5,976,429 A | 11/1999 | Chen et al. ............... 264/29.6 |
| 6,376,431 B1 * | 4/2002 | Matsumoto et al. ...... 508/107 |
| 6,398,991 B1 | 6/2002 | Brazil .................... 264/29.1 |
| 6,528,168 * | 3/2003 | Matsumoto et al. ...... 428/408 |

FOREIGN PATENT DOCUMENTS

EP    0 578 408 A2    1/1994

OTHER PUBLICATIONS

Pressureless Sintering of A–SiC, by T. Mizrah, M. Hoffmann, L. Gauckler, Neuhausen am Rheinfall, Switzerland.

* cited by examiner

Primary Examiner—Ellen M McAvoy
(74) Attorney, Agent, or Firm—Jenner & Block, LLC

(57) ABSTRACT

A composite body of silicon carbide having binderless, allotropic carbon granules distributed throughout is produced. The nominal size of the binderless allotropic carbon granules can range from 5 to 500 micrometers. The concentration of the binderless allotropic carbon particles can vary from 1.0 to 35.0 weight percent. The process to produce such a composite body is to sinter silicon carbide with binderless, carbon-yielding precursor granules. The composite body is utilized in tribological applications. The dense, impervious silicon carbide-binderless carbon composite exhibits excellent physical and tribological characteristics when used as a mechanical face seal, a sliding bearing arrangement, or some other rubbing component.

98 Claims, 3 Drawing Sheets

COMPOSITE BODY OF SILICON CARBIDE AND BINDERLESS CARBON, PROCESS FOR PRODUCING SUCH COMPOSITE BODY, AND ARTICLE OF MANUFACTURING UTILIZING SUCH COMPOSITE BODY FOR TRIBOLOGICAL APPLICATIONS

FIELD OF THE INVENTION

The present invention relates to a composite body of silicon carbide and binderless allotropic carbon, and to the process of making such a composite body. More specifically, it relates to making such composite bodies for use in tribological applications such as mechanical seals, bearings and other sliding or rubbing components, which require good durability and wear performance under less than ideal lubricating conditions.

BACKGROUND OF THE INVENTION

Material science has long been used as a basis for choosing materials for components having surfaces which are in or may come into sliding contact with each other. For example, in the field of mechanical face seals, a primary ring made of a carbon or carbon like material and a mating ring made of another material such as silicon carbide, tungsten carbide, alumina, stainless steel, etc., are generally known. However, in mechanical face seals exposed to highly abrasive fluids, the primary ring needs to be made of more abrasion resistant material than carbon. In such situations, a special silicon carbide may be run against a hard material such as another silicon carbide. In order to improve tribological compatibility of these hard face materials, especially at higher pressures, special silicon carbide grades have been developed. Since silicon carbide has relatively poor lubricity, the use of graphite incorporated into the matrix has been pursued by many inventors.

U.S. Pat. No. 4,536,449 by Kennedy et al, issued on Aug. 20, 1985, describes the addition of graphite to silicon carbide utilizing the reaction bonding process. Unfortunately, it is difficult to control the graphite size and content due to the normal presence of 2 to 20 percent highly reactive, free silicon.

Boecker et al describes a graphite containing silicon carbide produced by pressureless sintering in U.S. Pat. No. 4,525,461, issued on Jun. 25, 1985. This approach utilizes addition of small graphite particles not exceeding an average size of 8 micrometers. However, the addition of the amount and size of the graphite particles is limited by this procedure due to the inherently high shrinkage associated with the direct sintering process.

Okuno et al describes a silicon carbide-graphite composite material in U.S. Pat. No. 4,701,426, issued on Oct. 20, 1987, and in U.S. Pat. No. 4,690,909, issued on Sep. 1, 1987. According to these patents, graphite or carbon black added to the silicon carbide yielded a composite material where graphite having an average grain size of not more than 3 micrometers is uniformly dispersed as a secondary phase along the grain boundaries of all the silicon carbide grains.

Moehle et al describes a graphite containing silicon carbide in U.S. Pat. No. 4,942,145, issued on Jul. 17, 1990. This approach is based upon using an organosilicon binder such as polysilazanes, silicon carbide, and graphite fillers. The graphite containing silicon carbide is mixed with polysilazane dissolved in an organic solvent, dried, molded and pyrolyzed around 1300° C. In one example, such graphite containing silicon carbide sample was found to have 2.18 gM/CM3 density and a bending strength of 15.9]~g/MM2 (22,600 psi).

Talbert et al describes a graphite containing silicon carbide in U.S. Pat. No. 5,543,368, issued on Aug. 6, 1996, and U.S. Pat. No. 5,486,496, issued on Jan. 23, 1996. According to these patents, first the graphite powder is mixed with a binder such as polyethylene glycol and other additives to facilitate uniform dispersion of the graphite in the slurry. The size of the graphite was disclosed in the range of 3 to 4 micrometers. The graphite containing slurry is then spray dried to the desired size distribution of the graphite agglomerates. According to these patents, the preferred average spherical graphite agglomerate size is reported to be around 100 micrometers. Separately, the silicon carbide molding powder using sub-micrometer silicon carbide and the appropriate additives is produced by similar spray drying technique. Next, the desired amount of graphite agglomerates are added and blended with the spray dried silicon carbide molding powders. Finally, the desired graphite containing silicon carbide composite parts are processed according to teaching of U.S. Pat. No. 4,041,117 by Prochazka, issued on Aug. 9, 1977. As a result of using loosely bonded graphite agglomerates instead of solid graphite particles, the problem of adding graphite to the inherently high shrinkage self-sintered silicon carbide has been solved. However, the reproducibility of the material's tribological performance may be adversely affected by such an approach.

Chen et al describes a graphite containing silicon carbide in U.S. Pat. No. 5,422,322, issued on Jun. 6, 1995, and U.S. Pat. No. 5,656,563, issued on Aug. 12, 1997. The process for producing a graphite containing silicon carbide is described in U.S. Pat. No. 5,976,429, issued on Nov. 2, 1999. According to these patents, first the 45 micrometer size graphite is mixed with a phenolic resin dissolved in an organic solvent such as acetone. Then the mixture is dried to evaporate the solvent and crushed to pass through a 200 mesh screen. Next the desired amount of resin bonded graphite is added to the slurry comprised of sub-micro meter silicon carbide and associated additives. The slurry is spray dried to form spherical granules having an average size of less than 500 micrometers. The spray dried molding compound is pressed to the desired shape, carbonized to 850T, and sintered at preferably 2000 to 2200° C. in inert atmosphere such as helium or argon. The sintered silicon carbide-graphite composite contains between 2 to 30 percent by weight carbon bonded graphite. The composite, especially at higher carbon bonded graphite concentrations, contains structural defects described in the patent as microcracks. The shape of the carbon bonded graphite particles is also irregular, which maximizes stress concentrations in the sintered composite material. Furthermore, the large and uncontrolled particle size distribution of the resin coated graphite affects the reproducibility of the inherently high shrinkage of the silicon carbide matrix.

Graphite containing silicon carbides produced by different methods discussed in the prior art appear to result in a robust material with the process characteristics for highly demanding tribological applications.

SUMMARY OF THE INVENTION

The invention disclosed and claimed herein comprises a composite body of silicon carbide having binderless allotropic carbon distributed throughout, a process for producing such a composite body, and an article of manufacture for use in tribological applications, which utilizes such a composite body. The steps for producing the composite body include forming a mixture of silicon carbide and binderless, allotropic carbon-yielding precursor granules, then shaping and heating the mixture to form the desired composite body.

Articles made according to the present invention can be produced in a variety of shapes for use in tribological applications such as mechanical face seals.

DETAILED DESCRIPTION OF THE PREFERRED EMBODIMENTS

According to the present invention, it has been found that the performance characteristics of a self-sintered silicon carbide in rubbing applications, for example, in a mechanical face seal, a bearing, etc., unexpectedly improved by incorporating binderless, carbon-yielding precursor granules such as uncalcined green coke, phenol formaldahyde resin, spherical mesophase carbon, coal tar pitch, petroleum pitch, carbon-yielding resins, bitumen, bituminous coal, petroleum coke, lampblack, carbon black, or other carbonaceous granules into a self-sintered silicon carbide matrix. Articles made according to the present invention can be produced in variety of shapes such as rods, tubes, plates, etc. for use in seals bearings, vanes, pistons, valve seats etc.

Figure 1:
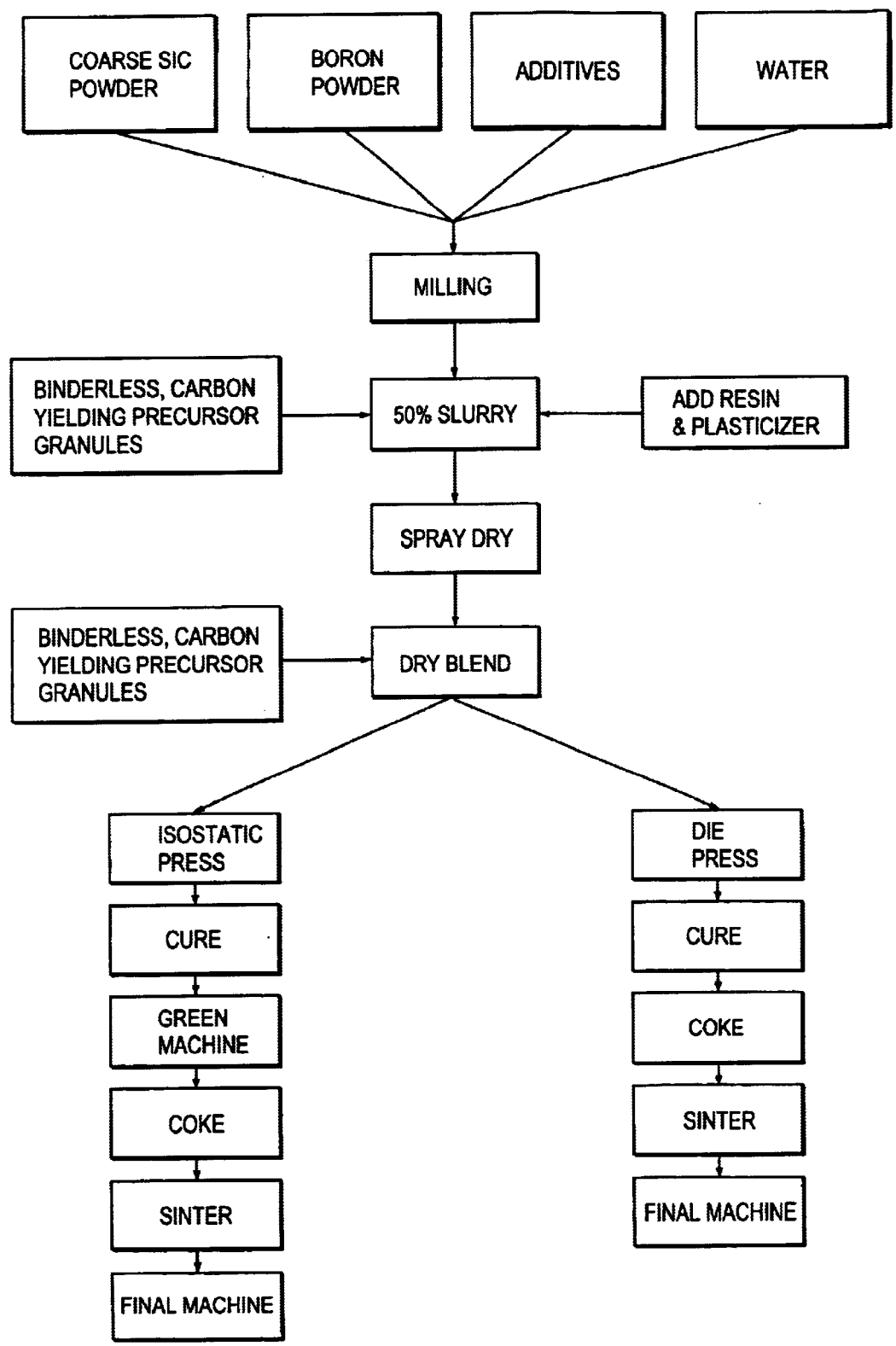
FIG. 1 is a schematic description of the process for producing a silicon carbide-binderless carbon composite body in accordance with the present invention.

Silicon carbide composite bodies made according to the present invention may be produced according to any of a number of standard pressureless, self-sintered silicon carbide manufacturing processes. The schematic description of the processes for producing the silicon carbide-binderless carbon composite body is shown in FIG. 1.

For the present invention, alpha phase silicon carbide, produced by the Acheson process, is the preferred raw material. The alpha silicon carbide contains a variety of different crystal structures with hexagonal and rhombohedral polytypes being the most predominant. The silicon carbide made by Acheson process can be green or black depending upon the type and amount of impurities. The green colored silicon carbide contains less impurities than the black. The major impurities in the black silicon carbide grains are aluminum, carbon and free silicon. The preferred silicon carbide for the present invention is green. However, the more abundant black silicon carbide can also be used. Beta phase silicon carbide, amorphous silicon carbide, alpha phase silicon carbide and the mixture thereof can also be used, and the silicon carbide can have spherical, ellipsoidal or irregular morphology.

The silicon carbide powder for the self-sintered process must have fine particle size, predominantly in the sub-micrometer range. The surface area of the silicon carbide powder is preferred to be in the 5 to 15 square meter per gram range determined by the B.E.T. method. The coarse silicon carbide can be milled to the desired particle size range by standard ball milling technique, utilizing silicon carbide grinding media. However, it may require further chemical purification to remove impurities that inhibit the sintering process. The starting silicon carbide feed stock should be smaller than 100 micrometers to achieve economical milling throughput. Although the desired particle size of silicon carbide can be obtained commercially from a number of vendors, the milling process is the preferred method due to the simultaneous milling and mixing of the desired amount of sintering aid, such as boron carbide, which is required for the pressureless self-sintering process. Elemental boron, aluminum, beryllium, carbon, or a combination thereof can also be used to catalyze the silicon carbide densification process. The preferred boron carbide concentration is about 0.5–2.0 weight percent. Again, submicrometer boron carbide is available on a commercial scale from a number of vendors.

The silicon carbide having the desired particle size distribution contains a considerable amount of surface oxides. To facilitate sintering, these surface oxides are removed by reacting the powder with uncombined carbon according to the following equation:

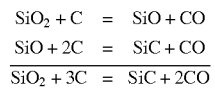

$$\begin{array}{rcl} SiO_2 + C & = & SiO + CO \\ SiO + 2C & = & SiC + CO \\ \hline SiO_2 + 3C & = & SiC + 2CO \end{array}$$

It is preferred that the uncombined carbon is uniformly distributed over the surface of the silicon carbide particles. This can be achieved by adding liquid carbonaceous precursor to the silicon carbide powder. Although any water or solvent soluble carbonaceous precursor can be used, water soluble phenol formaldehyde resin is the preferred material in the 2 to 8 weight percent range based upon the silicon carbide content of the batch.

Another additive needed to facilitate the formation of a strong green body is preferably a water soluble, organic resin material having very low char yield. Examples of such acceptable temporary fugitive binders include soluble polyvinyl alcohol, acrylic water soluble resin, phenolic resin, coal tar pitch, and other carbonaceous materials.

In order to facilitate the powder compaction process, an organic lubricating compound such as polyvinyl alcohol, oleic acid, acrylic resin, wetting agent, stearic acid, paraffin wax, or fatty acids must be added to the batch. The concentration of this additive is in the range of 0.5 to 3.0 weight percent based upon the silicon carbide content, or 0.1 to 15.0 weight percent of the total mixture.

The key ingredient for producing a self-lubricating silicon carbide-carbon composite is the binderless, carbon-yielding precursor granules. During the pressureless sintering, the linear shrinkage of the artifact produced can be as much as 17 percent. As a result of this shrinkage, incorporating non-shrinking carbon such as graphite will either inhibit the densification process or yield structural defects. In order to incorporate graphite into the dense silicon carbide matrix, the particle size and concentration of the graphite has to be small and low respectively. Techniques utilizing carbonaceous bindergraphite composite granules instead of graphite have been reported in the prior art.

According to the present invention, free graphite or carbon can be incorporated into the silicon carbide matrix at a high concentration without structural defects by utilizing binderless, carbon-yielding precursor granules such as uncalcined green coke, phenol formaldehyde resin, spherical mesophase carbon, and other carbonaceous granules. The green powder has a typical composition of 93.5 percent carbon, 4.5 percent hydrogen, 1.0 percent nitrogen and 1.0 percent oxygen. The average particle size of the green powder is available in the 1 to 80 micrometer range. The concentration of mesophase microbeads in the silicon carbide matrix can range from 2 to 30 weight percent. The average particle size can range from 25 to 80 micrometers.

As a result of the sintering temperature exceeding 2100° C., the highly oriented aromatic precursor will shrink and convert to graphite. The use of spherical particles will also yield a silicon carbide-carbon composite with less internal stress than a composite produced from irregular shape carbon. Nevertheless, highly oriented green needle coke can also be used for producing silicon carbide-graphite composite.

In short, the silicon carbide-carbon composite can be tailor-made according to the application requirement. The tribological performance of silicon carbide-carbon matrix can be controlled by either the use of a graphite-yielding, highly oriented aromatic precursor, or an amorphous carbon-yielding, less oriented heterocyclic carbonaceous precursor.

As shown is FIG. 1, the process of producing self-sintered silicon carbide-carbon composite starts with making a silicon carbide water slurry of fine silicon carbide powder. Next the desired amount of submicron boron carbide, or other sintering aid, is added to the slurry. Since the ultrafine silicon carbide contains a considerable amount of surface oxides, one must add a carbonaceous precursor such as water soluble phenol formaldehyde resin to the slurry. The preferred amount of resin is in the range of 2 to 8 weight percent of the silicon carbide powder. Next, a temporary binder, preferably a water soluble acrylic resin, is added to silicon carbide slurry. The preferred amount of temporary binder is in the range of 2 to 8 percent of the silicon carbide powder. An organic lubricating compound, such as stearic acid, is also added to the slurry in the range of 0.5 to 3.0 weight percent based upon the silicon carbide content of the slurry. However, the preferred method of adding this ingredient is by dry blending it with the spray dried silicon carbide slurry.

The slurry containing all the ingredients described above is spray dried following standard spray drying technology. Then, the spray dried particles are mixed with the desired amount of carbon-yielding precursor granules. Next, the mixture is pressed into the desired shape, cured, and green machined if needed. Since the carbonaceous components of the artifact has to be heat treated under atmospheric conditions, to obtain the desired amount of carbon content, and the sintering process is preferably conducted at reduced pressure, the coking and sintering processes are carried out separately in different equipment. First the artifacts are heat treated in an inert atmosphere to about 600° C. As a result of this heat treatment, the artifacts can be sintered under reduced pressure to facilitate the carbon surface oxide reactions. The sintering is carried out first in a vacuum up to 1800° C., then in argon or helium at 300 to 500 torr absolute pressure The peak sintering temperature is in the range of 2100 to 2200° C.

The preferred embodiments have been described in detail. As a result of this, a number of alternations of this invention can be practiced by those skilled in the art. The present invention is described in greater detail by the examples that follow. The examples are for illustration purposes only and are not intended to limit the scope of this invention.

EXAMPLE 1

A raw batch of the following composition was made:

| Component | Weight Percent |
| --- | --- |
| Silicon Carbide | 85.4 |
| Boron Carbide | 0.6 |
| Phenolic Resin | 7.0 |
| Acrylic Resin | 5.0 |
| Polyvinyl Alcohol | 1.0 |
| Oleic Acid | 1.0 |

The submicron silicon carbide powder had a B.E.T. surface area of 15 $m^2/g$. The median particle size was 0.6 micron. A commercially available boron carbide was used, having a B.E.T. surface area of 15–20 $m^2/g$ and a median particle size of 0.5 micron. The liquid water based phenolic resin had 70 percent solid content. The water emulsion acrylic resin had 45 percent solid content. The polyvinyl alcohol had 21 percent solid content. A distilled, tallow based oleic acid was used in this formulation.

The above described ingredients were used to produce a 40 weight percent water based slurry. First, silicon carbide powder was added to the desired amount of distilled water. The water was continuously stirred during silicon carbide addition. Next, the desired amount of boron carbide was added to the slurry. Finally the minor organic ingredients were added to the continuously stirred slurry. After mixing for one hour, the slurry was spray dried according to the standard, well-established practice known to those skilled in the art. The spray dried powder was screened through a 100 mesh screen to eliminate large unwanted particles. The free flowing molding powder was subsequently processed as described in the following examples.

EXAMPLE 2

Green coke having a volatile content of 14 percent was milled and screened through 100 mesh to produce a powder having particle size less than 150 micrometers. This powder was dry blended with the silicon carbide molding powder described in Example 1. A mixture was made according to the following formula:

| Component | Weight Percent |
| --- | --- |
| Spray dried silicon carbide molding powder | 95.0 |
| Green Coke | 5.0 |

Figure 2:
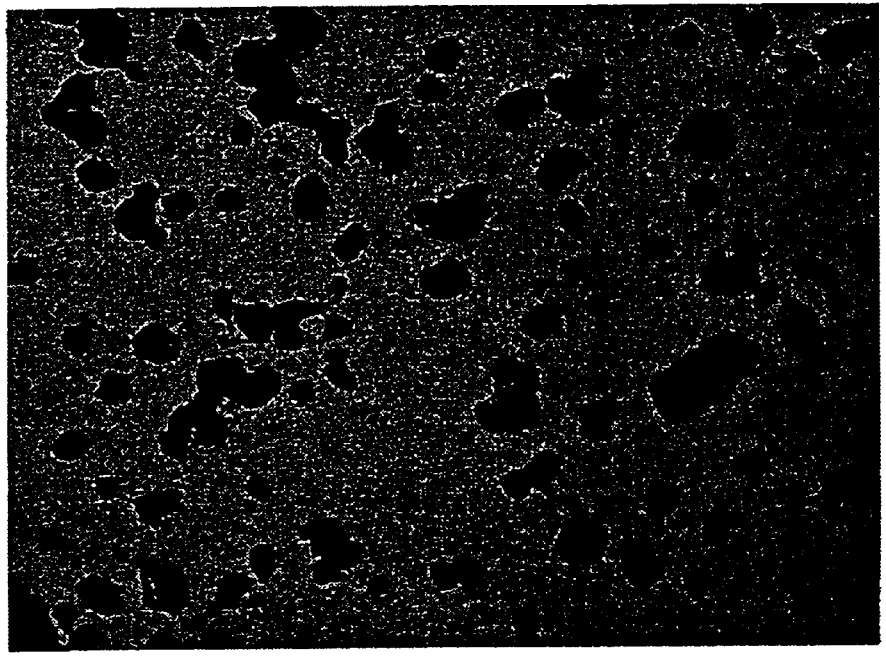
FIG. 2 shows the surface topography of a polished ring of the composite body, formed from a mixture of spray dried silicon carbide powder and green coke.

The above mixture was blended for five minutes in a V-shaped blender equipped with an intensifier bar. Tubes were isostatically molded from the powder mixture at 17,000 psi pressure. The molded tubes were cured to 175° C. and green machined to the desired ring configuration. The rings were sintered in a vacuum to 2100° C. The density of the sintered parts were found to be about 3.02g/$cm^3$. FIG. 2 shows the surface topography of the polished rings. The rings were tested and passed for imperviousness using nitrogen at 100 psig. The rings were found to be free of microcracks.

EXAMPLE 3

Spray dried phenolic resin was screened to remove all particles above 150 micrometers. This powder was dry blended with silicon carbide molding powder according to the following formula:

| Component | Weight Percent |
|---|---|
| Spray dried silicon carbide molding powder | 95.0 |
| Spray dried phenolic resin | 5.0 |

Figure 3:
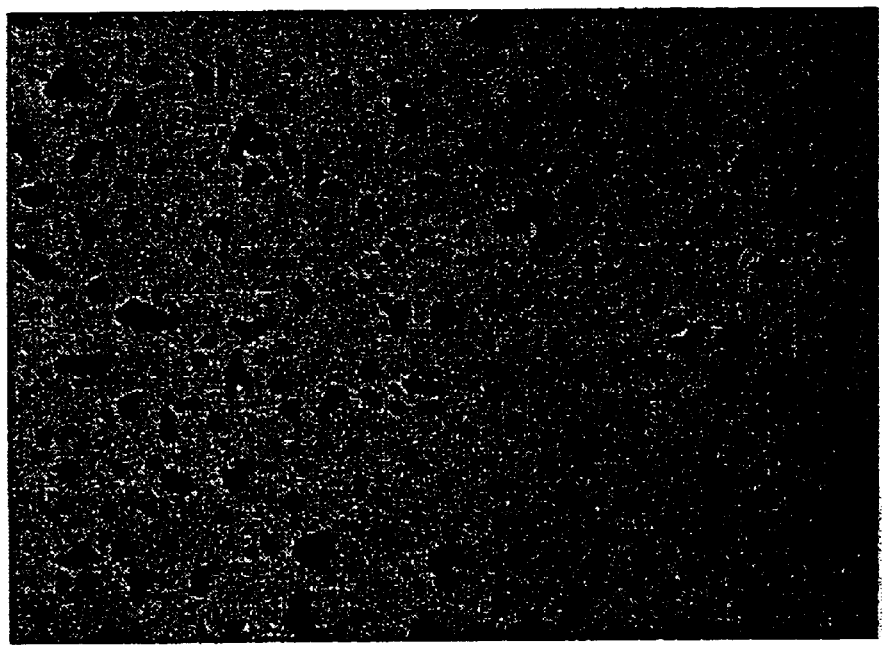
FIG. 3 shows the surface topography of a polished ring of the composite body, formed from a mixture of spray dried silicon powder and spray dried phenolic resin.

The above mixture was blended for five minutes in a V-shaped blender equipped with an intensifier bar. Tubes were isostatically pressed from the above described powder mixture at 17,000 psi pressure. The molded tubes were cured to 175° C. and green machined to the desired ring configuration. The machined rings were first carbonized to 600° C. in nitrogen atmosphere, then sintered in a vacuum to 2100° C. The density of the sintered parts were measured to be about 2.95g/cm$^3$. FIG. 3 shows the surface topography of the polished rings. It must be noted that the rings made according to the described process were found to be free of microcracks and/or interconnected porosity. The rings were also tested and passed for imperviousness using nitrogen at 100 psig.

EXAMPLE 4

Spherical green mesophase carbonaceous powder made from coal tar pitch has been used as an additive to the silicon carbide molding powder. The average size of the mesophase microbeads was about 25 micrometers. The following formula was used:

| Component | Weight Percent |
|---|---|
| Spray dried silicon carbide molding powder | 97.5 |
| Spherical green mesophase microbeads | 2.5 |

Figure 4:
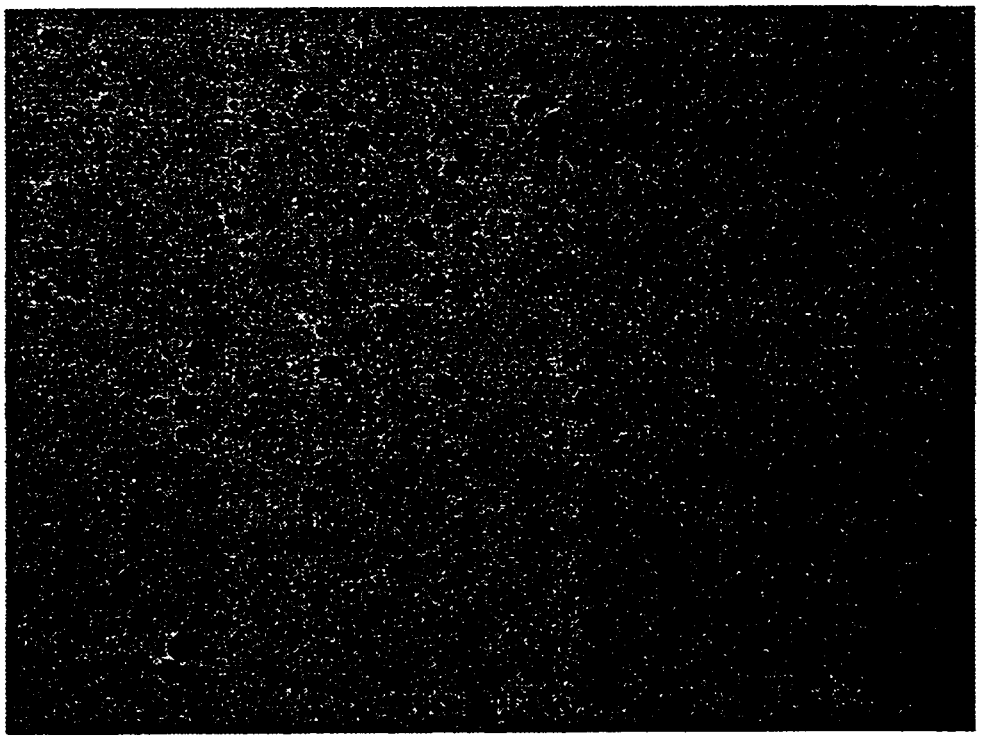
FIG. 4 shows the surface topography of a polished ring of the composite body, formed from a mixture of spray dried silicon carbide powder and spherical green mesophase microbeads.

The above mixture was blended for five minutes in a V-shaped blender equipped with intensifier bar. Tubes were isostatically pressed from the above described powder mixture at 17,000 psi pressure. The molded tubes were cured to 1750° C. and green machined to the desired ring configuration. The machined rings were first carbonized to 600° C. in nitrogen atmosphere, then sintered in a vacuum to 2100° C. The density of the sintered parts was measured to be about 3.10g/cm$^3$. FIG. 4 shows the surface topography of the polished rings. The rings were also tested and passed for imperviousness using nitrogen at 100 psig. The rings were found to be free of microcracks.

The invention has been described in detail in the above cited examples and with regard to specific embodiments. This description has been presented for the purposes of illustration and is not intended to be exhaustive or to limit the invention. Various modifications and changes can be made to devices made in accordance with the teaching of this patent without departing from the scope and spirit of the invention as claimed below.

We claim:

1. A composite body of silicon carbide comprising:
   a. sintered silicon carbide matrix formed by the pressureless self-sintering method; and
   b. binderless allotropic carbon granules distributed throughout the silicon carbide matrix.

2. A composite body of silicon carbide as recited in claim 1 wherein the binderless allotropic carbon granules are uniformly distributed throughout the silicon carbide matrix.

3. A composite body of silicon carbide as recited in claim 1 wherein the binderless allotropic carbon granules comprise 1.0 to 35.0 weight percent of the composite body.

4. A composite body of silicon carbide as recited in claim 1 wherein the binderless carbon granules have graphitic structure.

5. A composite body of silicon carbide as recited in claim 1 wherein the binderless carbon granules have amorphous carbon structure.

6. A composite body of silicon carbide as recited in claim 1 wherein the binderless carbon granules contain internal porosity.

7. A composite body of silicon carbide as recited in claim 1 wherein the silicon carbide matrix has spherical morphology.

8. A composite body of silicon carbide as recited in claim 1 wherein the silicon carbide matrix has ellipsoidal morphology.

9. A composite body of silicon carbide as recited in claim 1 wherein the silicon carbide matrix has irregular morphology.

10. A composite body of silicon carbide as recited in claim 1 wherein the size of the binderless allotropic carbon granules is between 5 and 500 micrometers.

11. A composite body of silicon carbide as recited in claim 7 wherein the size of the binderless allotropic carbon granules is between 5 and 500 micrometers.

12. A composite body of silicon carbide as recited in claim 8 wherein the size of the binderless allotropic carbon granules is between 5 and 500 micrometers.

13. A composite body of silicon carbide as recited in claim 9 wherein the size of the binderless allotropic carbon granules is between 5 and 500 micrometers.

14. A composite body of silicon carbide as recited in claim 1 wherein the silicon carbide is alpha phase silicon carbide.

15. A composite body of silicon carbide as recited in claim 1 wherein the silicon carbide is beta phase silicon carbide.

16. A composite body of silicon carbide as recited in claim 1 wherein the silicon carbide is amorphous silicon carbide.

17. A composite body of silicon carbide as recited in claim 1 wherein the silicon carbide is a mixture of two or more of the following: alpha phase silicon carbide, beta phase silicon carbide, and amorphous silicon carbide.

18. A process for producing a composite body of silicon carbide comprising the steps of:
   a. forming a mixture comprising the components of:
      i. a silicon carbide,
      ii. a sintering aid, and
      iii. binderless, carbon-yielding precursor granules, free of non-shrinking carbon;
   b. shaping the mixture; and
   c. sintering the shaped mixture.

19. The process as recited in claim 18 wherein the silicon carbide is alpha phase silicon carbide.

20. The process as recited in claim 18 wherein the silicon carbide is beta phase silicon carbide.

21. The process as recited in claim 18 wherein the silicon carbide is amorphous silicon carbide.

22. The process as recited in claim 18 wherein the silicon carbide is a mixture of two or more of the following: alpha phase silicon carbide, beta phase silicon carbide, and amorphous silicon carbide.

23. The process as recited in claim 18 wherein the binderless, carbon-yielding precursor is a graphite-yielding, highly oriented aromatic precursor.

24. The process as recited in claim 18 wherein the binderless, carbon yielding precursor is an amorphous carbon-yielding, less oriented heterocyclic carbonaceous precursor.

25. The process as recited in claim 18 wherein the binderless, carbon-yielding precursor is uncalcined green coke.

26. The process as recited in claim 18 wherein the binderless, carbon-yielding precursor is phenol formaldahyde resin.

27. The process as recited in claim 18 wherein the binderless, carbon-yielding precursor is spherical mesophase carbon.

28. The process as recited in claim 18 wherein the binderless, carbon-yielding precursor is a carbonaceous granule.

29. The process as recited in claim 18 wherein the binderless, carbon-yielding precursor is a carbon-yielding resin.

30. The process as recited in claim 18 wherein the binderless, carbon-yielding precursor is coal tar pitch.

31. The process as recited in claim 18 wherein the binderless, carbon-yielding precursor is petroleum pitch.

32. The process as recited in claim 18 wherein the binderless, carbon-yielding precursor is bitumen.

33. The process as recited in claim 18 wherein the binderless, carbon-yielding precursor is bituminous coal.

34. The process as recited in claim 18 wherein the binderless, carbon-yielding precursor is petroleum coke.

35. The process as recited in claim 18 wherein the binderless, carbon-yielding precursor is lampblack.

36. The process as recited in claim 18 wherein the binderless, carbon-yielding precursor is carbon black.

37. The process as recited in claim 18 wherein the amount of binderless, carbon-yielding precursor is in the range of 1.0 to 35.0 weight percent of the total mixture.

38. The process as recited in claim 18 wherein the sintering aid is boron.

39. The process as recited in claim 18 wherein the sintering aid is aluminum.

40. The process as recited in claim 18 wherein the sintering aid is beryllium.

41. The process as recited in claim 18 wherein the sintering aid is carbon.

42. The process as recited in claim 18 wherein the sintering aid is a compound comprising two or more of the following: boron, aluminum, beryllium, and carbon.

43. The process as recited in claim 18 wherein the amount of sintering aid is in the range of 0.1 to 15.0 weight percent of the total mixture.

44. A process for producing a composite body of silicon carbide comprising the steps of:
  a. forming a mixture comprising:
    i. liquid medium,
    ii. silicon carbide,
    iii. sintering aid,
    iv. wetting agent,
    v. anti-flocculant agent,
    vi. carbon-yielding organic compound,
    vii. temporary binder,
    viii. organic lubricant, and
    ix. binderless, carbon-yielding precursor granules, free of non-shrinking carbon;
  b. pressing the mixture to form a consolidated body;
  c. curing the consolidated body;
  d. carbonizing the consolidated body; and
  e. sintering the consolidated body.

45. The process for producing a composite body of silicon carbide as recited in claim 44 wherein the steps for producing the mixture comprise:
  a. milling silicon carbide and sintering aid in a liquid medium to form a slurry;
  b. adding wetting and anti-flocculant agents to the slurry;
  c. adding binderless, carbon-yielding precursor granules, free of non-shrinking carbon, to the slurry;
  d. adding carbon-yielding organic compounds to the slurry;
  e. adding temporary binder to the slurry;
  f. adding lubricants to the slurry; and
  g. spray drying the slurry.

46. The process for producing a composite body of silicon carbide as recited in claim 44 wherein the steps for forming the mixture comprise:
  a. milling silicon carbide and sintering aid in a liquid medium to form a slurry;
  b. adding wetting and anti-flocculant agents to the slurry;
  c. adding carbon-yielding organic compounds to the slurry;
  d. adding temporary binder to the slurry;
  e. adding lubricants to the slurry;
  f. spray drying the slurry; and
  g. dry blending binderless, carbon-yielding precursor granules, free of non-shrinking carbon, with spray dried slurry.

47. The process for producing a composite body of silicon carbide as recited in claim 44 wherein the steps for pressing, curing, carbonizing, and sintering the mixture comprise:
  a. isostatically pressing the mixture to form a consolidated body;
  b. curing the consolidated body to polymerize the resin;
  c. green machining the consolidated body;
  d. carbonizing the consolidated body; and
  e. sintering the consolidated body.

48. The process for producing a composite body of silicon carbide as recited in claim 44 wherein the steps for pressing, curing, carbonizing, and sintering the mixture comprise:
  a. die pressing the mixture to form a consolidated body;
  b. curing the consolidated body to polymerize the resin;
  c. carbonizing the consolidated body; and
  d. sintering the consolidated body.

49. The process as recited in claim 44 wherein the silicon carbide is alpha phase silicon carbide.

50. The process as recited in claim 44 wherein the silicon carbide is beta phase silicon carbide.

51. The process as recited in claim 44 wherein the silicon carbide is amorphous silicon carbide.

52. The process as recited in claim 44 wherein the silicon carbide is a mixture of two or more of the following: alpha phase silicon carbide, beta phase silicon carbide, and amorphous silicon carbide.

53. The process as recited in claim 44 wherein the binderless, carbon-yielding precursor is uncalcined green coke.

54. The process as recited in claim 44 wherein the binderless, carbon-yielding precursor is phenol formaldehyde resin.

55. The process as recited in claim 44 wherein the binderless, carbon-yielding precursor is spherical mesophase carbon.

56. The process as recited in claim 44 wherein the binderless, carbon-yielding precursor is a carbonaceous granule.

57. The process as recited in claim 44 wherein the binderless, carbon-yielding precursor is a carbon-yielding resin.

58. The process as recited in claim 44 wherein the binderless, carbon-yielding precursor is coal tar pitch.

59. The process as recited in claim 44 wherein the binderless, carbon-yielding precursor is petroleum pitch.

60. The process as recited in claim 44 wherein the binderless, carbon-yielding precursor is bitumen.

61. The process as recited in claim 44 wherein the binderless, carbon-yielding precursor is bituminous coal.

62. The process as recited in claim 44 wherein the binderless, carbon-yielding precursor is petroleum coke.

63. The process as recited in claim 44 wherein the binderless, carbon-yielding precursor is lampblack.

64. The process as recited in claim 44 wherein the binderless, carbon-yielding precursor is carbon black.

65. The process as recited in claim 44 wherein the amount of binderless, carbon-yielding precursor is in the range of 1.0 to 35.0 weight percent of the total mixture.

66. The process as recited in claim 44 wherein the sintering aid is boron.

67. The process as recited in claim 44 wherein the sintering aid is aluminum.

68. The process as recited in claim 44 wherein the sintering aid is beryllium.

69. The process as recited in claim 44 wherein the sintering aid is carbon.

70. The process as recited in claim 44 wherein the sintering aid is a compound comprising two or more of the following: boron, aluminum, beryllium, and carbon.

71. The process as recited in claim 44 wherein the amount of sintering aid is in the range of 0.1 to 15.0 weight percent of the total mixture.

72. The process as recited in claim 44 wherein the organic lubricating compound is polyvinyl alcohol.

73. The process as recited in claim 44 wherein the organic lubricating compound is oleic acid.

74. The process as recited in claim 44 wherein the organic lubricating compound is acrylic resin.

75. The process as recited in claim 44 wherein the organic lubricating compound is a wetting agent.

76. The process as recited in claim 44 wherein the organic lubricating compound is stearic acid.

77. The process as recited in claim 44 wherein the organic lubricating compound is paraffin wax.

78. The process as recited in claim 44 wherein the organic lubricating compound is fatty acids.

79. The process as recited in claim 44 wherein the amount of organic lubricating compound is in the range of 1.0 to 20.0 weight percent of the total mixture.

80. The process as recited in claim 44 wherein the mixture comprises an additional component of inorganic impurities deriving from the raw materials.

81. An article of manufacture for use in tribological application formed from a composite body of silicon carbide comprising:

a. a sintered silicon carbide matrix formed by the pressureless self-sintering method; and b. binderless allotropic carbon granules distributed throughout the silicon carbide matrix.

82. The article of manufacture as recited in claim 81 wherein the binderless, allotropic carbon granules are uniformly distributed throughout the silicon carbide matrix.

83. The article of manufacture as recited in claim 81 wherein the composite body of silicon carbide is a component of a mechanical face seal.

84. The article of manufacture as recited in claim 81 wherein the binderless allotropic carbon granules comprise 1.0 to 35.0 weight percent of the composite body.

85. The article of manufacture as recited in claim 81 wherein the binderless carbon granules have graphitic structure.

86. The article of manufacture as recited in claim 81 wherein the binderless carbon granules have amorphous carbon structure.

87. The article of manufacture as recited in claim 81 wherein the binderless carbon granules contain internal porosity.

88. The article of manufacture as recited in claim 81 wherein the silicon carbide matrix has spherical morphology.

89. The article of manufacture as recited in claim 81 wherein the silicon carbide matrix has ellipsoidal morphology.

90. The article of manufacture as recited in claim 81 wherein the silicon carbide matrix has irregular morphology.

91. The article of manufacture as recited in claim 81 wherein the size of the binderless allotropic carbon granules is between 5 and 500 micrometers.

92. The article of manufacture as recited in claim 88 wherein the size of the binderless allotropic carbon granules is between 5 and 500 micrometers.

93. The article of manufacture as recited in claim 89 wherein the size of the binderless allotropic carbon granules is between 5 and 500 micrometers.

94. The article of manufacture as recited in claim 90 wherein the size of the binderless allotropic carbon granules is between 5 and 500 micrometers.

95. An article of manufacture as recited in claim 81 wherein the silicon carbide is alpha phase silicon carbide.

96. An article of manufacture as recited in claim 81 wherein the silicon carbide is beta phase silicon carbide.

97. An article of manufacture as recited in claim 81 wherein the silicon carbide is amorphous silicon carbide.

98. An article of manufacture as recited in claim 81 wherein the silicon carbide is a mixture of two or more of the following: alpha phase silicon carbide, beta phase silicon carbide, and amorphous silicon carbide.

* * * * *

UNITED STATES PATENT AND TRADEMARK OFFICE
CERTIFICATE OF CORRECTION

PATENT NO. : 6,716,800 B2
DATED : April 6, 2004
INVENTOR(S) : Demendi et al.

It is certified that error appears in the above-identified patent and that said Letters Patent is hereby corrected as shown below:

<u>Title page, Item [54] and Column 1, line 4,</u>
Title, "MANUFACTURING" should be -- MANUFACTURE --

Signed and Sealed this

Twelfth Day of April, 2005

JON W. DUDAS
*Director of the United States Patent and Trademark Office*